United States Patent
Tokunaga

(10) Patent No.: US 7,254,321 B2
(45) Date of Patent: Aug. 7, 2007

(54) IMAGE CAPTURING APPARATUS, IMAGE CAPTURING METHOD, AND COMPUTER PROGRAM

(75) Inventor: Tatsuyuki Tokunaga, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 11/085,875

(22) Filed: Mar. 22, 2005

(65) Prior Publication Data

US 2005/0213957 A1 Sep. 29, 2005

(30) Foreign Application Priority Data

Mar. 26, 2004 (JP) .............................. 2004-091827

(51) Int. Cl.
*G03B 15/05* (2006.01)

(52) U.S. Cl. ........................ 396/61; 396/157

(58) Field of Classification Search ................. 396/61, 396/157; 348/370, 371
See application file for complete search history.

(56) References Cited

U.S. PATENT DOCUMENTS

| 5,309,193 A | 5/1994 | Takagi |
| 6,349,175 B1 | 2/2002 | Tokunaga |
| 6,928,239 B2 * | 8/2005 | Fukui .......................... 396/61 |

* cited by examiner

*Primary Examiner*—W. B. Perkey
(74) *Attorney, Agent, or Firm*—Canon U.S.A. Inc. I.P. Div

(57) ABSTRACT

An image capturing apparatus in which the ratio between the brightness just before preliminary light emission and the brightness at preliminary light emission is calculated for each of a plurality of photometric areas. The highest ratio among the ratios in the areas is extracted as a reference value, the extracted reference value is compared with the ratio in each area, and a weighting coefficient in each area is calculated. By using the obtained weighting coefficient, the amount of light to be emitted for obtaining correct exposure is calculated.

19 Claims, 10 Drawing Sheets

400

900

| FOCAL LENGTH (f) | LVLO |
|---|---|
| TO 40 mm | STANDARD REFLECTED LIGHT IN 0.5 m |
| 40 TO 75 mm | STANDARD REFLECTED LIGHT IN 0.8 m |
| 75 TO 100 mm | STANDARD REFLECTED LIGHT IN 1.1 m |
| FROM 100 mm | STANDARD REFLECTED LIGHT IN 1.4 m |

| RR(i) | W(i) |
|---|---|
| TO -2 | 1 |
| -2 TO -0.5 | 5 |
| -0.5 TO 0 | 10 |
| 0 TO 0.2 | 12 |
| 0.2 TO 0.4 | 11 |
| 0.4 TO 0.6 | 10 |
| 0.6 TO 0.8 | 8 |
| 0.8 TO 1.0 | 6 |
| 1.0 TO 1.5 | 4 |
| 1.5 TO 2.0 | 2 |
| 2.0 | 0 |

IMAGE CAPTURING APPARATUS, IMAGE CAPTURING METHOD, AND COMPUTER PROGRAM

BACKGROUND OF THE INVENTION

1. Field of the Invention

The present invention relates to an image capturing apparatus, an image capturing method, and a computer program, particularly used for performing an exposure operation.

2. Description of the Related Art

Hitherto, various strobe camera systems for performing an exposure operation by adjusting the amount of light emitted to a subject in order to automatically obtain adequate exposure have been proposed. Among those systems, the following type of system is effectively used for responding to various situations of a picture frame. That is, in the system, preliminary light emission is performed prior to exposure, light reflected from a subject at the preliminary light emission is measured for each area in a picture frame, and the amount of light to be emitted at actual light emission is controlled based on the measurement result.

U.S. Pat. No. 5,309,193 discloses the following method. The light reflected from a subject at preliminary light emission is measured in each of a plurality of areas in a picture frame. Among those areas, areas where the measurement value is outside a predetermined range are eliminated from the target of calculation of the amount of light for actual light emission. Also, the amount of light to be emitted at the actual light emission is determined by adding a predetermined correcting value to the value of reflected light at the preliminary light emission.

On the other hand, U.S. Pat. No. 6,349,175 discloses the following method. That is, a weighting coefficient of each of a plurality of areas in a picture frame is determined based on the level of the reflected light at preliminary light emission, and weighting for the amount of light to be emitted at actual light emission is averaged by using the determined weighting coefficients, and the amount of light to be emitted is determined accordingly.

In these known techniques, however, when a reflective object, such as a window, faces a picture frame, the light emitted from a strobe device and reflected by a subject makes the photometric value high. Therefore, when the amount of light to be emitted from the strobe device is controlled, the amount of light may be smaller than necessary so as to cause underexposure.

In another case, if a main subject in a picture frame is too small, the light emitted from a strobe device and reflected by the subject makes the photometric value low. Therefore, when the amount of light to be emitted from the strobe device is controlled, the amount of light may be larger than necessary so as to cause overexposure.

SUMMARY OF THE INVENTION

The present invention provides an image capturing apparatus and a method for controlling the amount of light for highly and reliably obtaining a correct and stable amount of exposure, and a program for allowing a computer to execute this method.

In one aspect of the present invention, an image capture apparatus includes: a preliminary-emission control unit configured to perform preliminary light emission to a subject; a photometric unit configured to measure brightness of the subject in a picture frame having a plurality of areas at a first timing when the preliminary-emission control unit is not performing preliminary light emission and at a second timing when the preliminary-emission control unit is performing preliminary light emission; a calculating unit calculating a ratio between first photometric information indicating the brightness measured by the photometric unit at the first timing and second photometric information indicating the brightness measured by the photometric unit at the second timing, the calculating unit calculating the ratio for each of the plurality of areas; an extracting unit extracting a reference ratio from among the ratios of the plurality of areas calculated by the calculating unit; an evaluation-value calculating unit comparing the reference ratio extracted by the extracting unit with the ratios of the plurality of areas calculated by the calculating unit, and calculating an evaluation value for each of the plurality of areas based on the comparison; and an actual-emission-light calculating unit evaluating the second photometric information for each area based on the evaluation value of each area calculated by the evaluation-value calculating unit, and calculating an amount of light to be emitted in an exposure operation based on the evaluation.

In a second aspect of the present invention, a method is provided for controlling an amount of light emitted from a strobe device for taking a picture of a subject with an image capturing apparatus. The method includes the following steps: a preliminary-emission control step of performing preliminary light emission to the subject; a measuring step of measuring brightness of the subject in a picture frame having a plurality of areas at a first timing when preliminary light emission is not performed in the preliminary-emission control step and at a second timing when preliminary light emission is being performed in the preliminary-emission control step; a calculating step of calculating a ratio between first photometric information indicating the brightness measured at the first timing in the measuring step and second photometric information indicating the brightness measured at the second timing in the measuring step, the ratio being calculated for each of the plurality of areas; an extracting step of extracting a reference ratio from among the ratios for the plurality of areas calculated in the calculating step; an evaluation-value calculating step of comparing the reference ratio extracted in the extracting step with the ratio for each area calculated in the calculating step and calculating an evaluation value for each area based on the comparison; and an actual-emission-light calculating step of evaluating the second photometric information for each area by using the evaluation value for each area calculated in the evaluation-value calculating step and calculating an amount of light to be emitted in an exposure operation based on the evaluation.

Other features and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and, together with the description, serve to explain the principles of the invention.

FIG. 10 is a table showing an example relationship between (i): the difference between the ratio of the brightness just before preliminary light emission to the brightness at preliminary light emission and a reference value; and (ii): a weighting coefficient according to the first embodiment.

DESCRIPTION OF THE EMBODIMENTS

Hereinafter, embodiments of the present invention will be described with reference to the drawings.

First Embodiment

Figure 1:
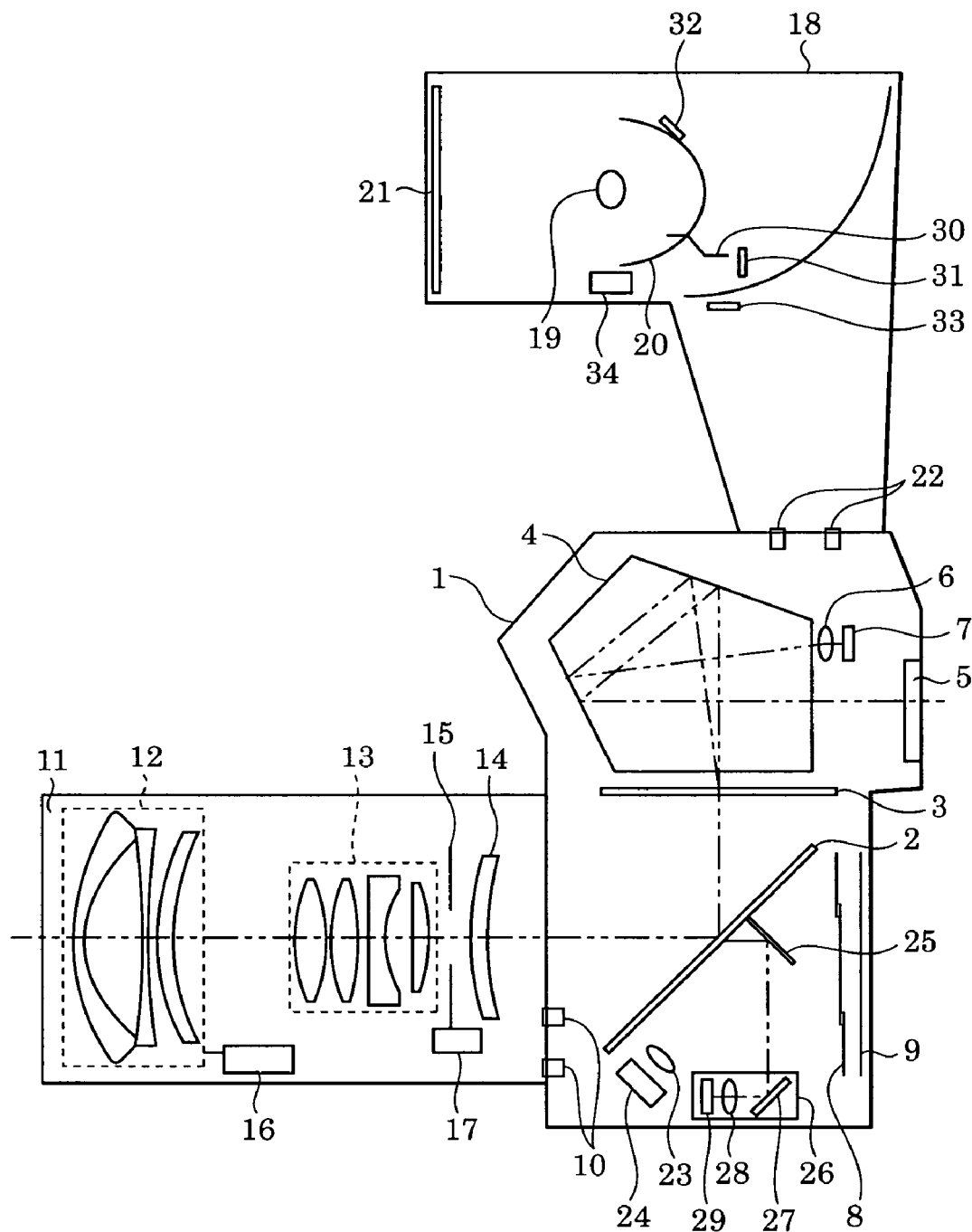
FIG. 1 is a schematic drawing of an example configuration of a strobe camera system according to a first embodiment of the present invention.

FIG. 1 is a schematic drawing showing an example configuration of a strobe camera system according to a first embodiment of the present invention. In this embodiment, a single-lens reflex (SLR) camera using silver-halide film is adopted as an example. FIG. 1 mainly illustrates an optical configuration of the strobe camera system.

Reference numeral 1 denotes a camera body, which accommodates optical components, mechanical components, electric circuits, a film, and so on, so that pictures can be taken. Reference numeral 2 denotes a main mirror, which is placed in a slanting direction with respect to a shooting optical path or is removed therefrom according to an observing or shooting condition. The main mirror 2 can be a half mirror allowing about half of a light beam from a subject to pass therethrough so that the light beam is transmitted to a focus-detecting optical system (to be described later) even when the main mirror 2 is placed in a slanting direction.

Reference numeral 3 denotes a focusing plate, disposed on an expected image-formation plane of objective taking lens groups 12 to 14. Reference numeral 4 denotes a pentaprism for changing a finder optical path. Reference numeral 5 denotes a finder. By viewing the focusing plate 3 through the finder 5, a photographer can view a picture frame. Reference numerals 6 and 7 denote an image-forming lens and a multi-division photometric sensor, respectively, for measuring the subject brightness in a picture frame. The image-forming lens 6 associates the focusing plate 3 with the multi-division photometric sensor 7 via a reflected-light path in the pentaprism 4.

Figure 4:
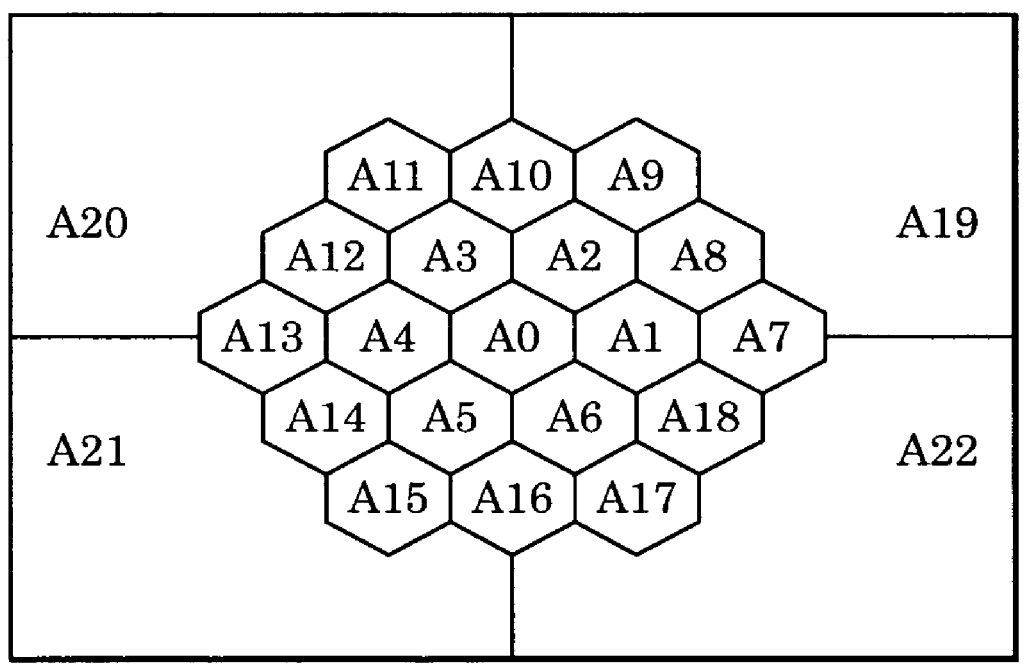
FIG. 4 shows an example of a picture frame consisting of a plurality of photometric areas according to the first embodiment.

FIG. 4 shows an example of photometric areas in a picture frame 400. The picture frame 400 consists of 23 photometric areas A0 to A22. The multi-division photometric sensor 7 is capable of measuring the brightness of the respective photometric areas A0 to A22, which are associated with the picture frame 400.

Referring back to FIG. 1, reference numeral 8 denotes a shutter. Reference numeral 9 denotes a photosensitive material, such as silver-halide film. As described above, the main mirror 2 allows about half of a light beam from a subject to pass therethrough even when disposed in a slanting direction. Reference numeral 25 denotes a sub-mirror, which refracts a light beam from a subject in a downward direction and leads the light beam toward a focus detecting unit 26. A secondary image-forming mirror 27, a secondary image-forming lens 28, a focus-detecting line sensor 29, and so on are provided in the focus detecting unit 26.

In this embodiment, the secondary image-forming mirror 27 and the secondary image-forming lens 28 constitute the focus-detecting optical system, and the secondary image-forming mirror 27 and the secondary image-forming lens 28 form a secondary image-formation plane of a shooting optical system on the focus-detecting line sensor 29. The focus detecting unit 26 detects the focus state of a subject in the picture frame 400 by a known phase-difference detecting method, which is performed by the processing of an electric circuit (to be described later), and controls a focus adjusting mechanism of the objective taking lens groups 12 to 14 based on the detected focus state of the subject. In this way, the focus detecting unit 26 realizes an automatic focus detecting device in this embodiment. The focus detecting unit (automatic focus detecting device) 26 detects the focus state of the seven photometric areas A0 to A6 in the picture frame 400 shown in FIG. 4.

Reference numeral 23 denotes a photometric lens for measuring light on a film surface, and reference numeral 24 denotes a film-surface photometric sensor. These devices 23 and 24 are used for so-called TTL (through the lens) light control, in which the amount of exposure is measured by using diffusion and reflection of light reaching the film surface during exposure so as to obtain a correct amount of light from a strobe device.

Reference numeral 10 denotes a mount contact unit serving as an interface between the camera body 1 and the objective taking lens groups, and reference numeral 11 denotes a lens barrel mounted on the camera body 1. Among the objective taking lens groups, the first lens group 12 is horizontally movable on the optical axis, so that the focus point of the picture frame 400 can be adjusted. The second lens group 13 is also horizontally movable on the optical axis, so that the scaling of the picture frame 400 can be performed and the focal length of the objective taking lenses can be changed. The third lens group 14 is fixed. Reference numeral 15 denotes a lens diaphragm.

Reference numeral 16 denotes a driving motor for the first lens group 12, which is capable of automatically adjusting the focus position by moving the first lens group 12 to the right or left according to an automatic focus adjusting operation. Reference numeral 17 denotes a driving motor for the lens diaphragm 15, which controls the aperture.

Reference numeral 18 denotes an external strobe device, which is mounted on the camera body 1 and controls light emission in response to a signal from the camera body 1. Hereinafter, the external strobe device 18 will be simply called a strobe device 18 as necessary. Reference numeral 19 denotes a xenon tube, which converts current energy to light emission energy. Reference numerals 20 and 21 denote a reflector and a Fresnel lens, respectively, which play a role in efficiently focusing the light emission energy towards a subject. Reference numeral 22 denotes a strobe contact unit, serving as an interface between the camera body 1 and the strobe device 18.

Reference numeral 30 denotes a glass fiber, which leads light from the xenon tube 19 to a monitoring sensor (PD1) 31. The sensor (PD1) 31 directly measures the amount of light of the strobe device 18 at preliminary light emission and actual light emission, and serves as a sensor for controlling the amount of actual light emission, which is a feature of this embodiment. Reference numeral 32 denotes a sensor (PD2) for monitoring the light emitted from the xenon tube 19. The light emission current of the xenon tube 19 is restricted by the output of the sensor (PD2) 32. Accordingly, the strobe device 18 can perform flat light emission.

Reference numeral 33 denotes a switch for detecting whether the strobe device 18 is set to a bounce mode. Reference numeral 34 denotes an emission-angle (strobe zoom) adjusting mechanism which moves the reflector 20 back and forth and adjusts the emission angle of strobe light for the picture frame 400 in accordance with the focal length of the objective taking lens groups 12 to 14. In FIG. 1, only optical and mechanical components among components required for describing this embodiment are shown. Other than these optical and mechanical components, electric circuits must be provided in the strobe camera system. However, the electric circuits are not shown in FIG. 1.

Figure 2:
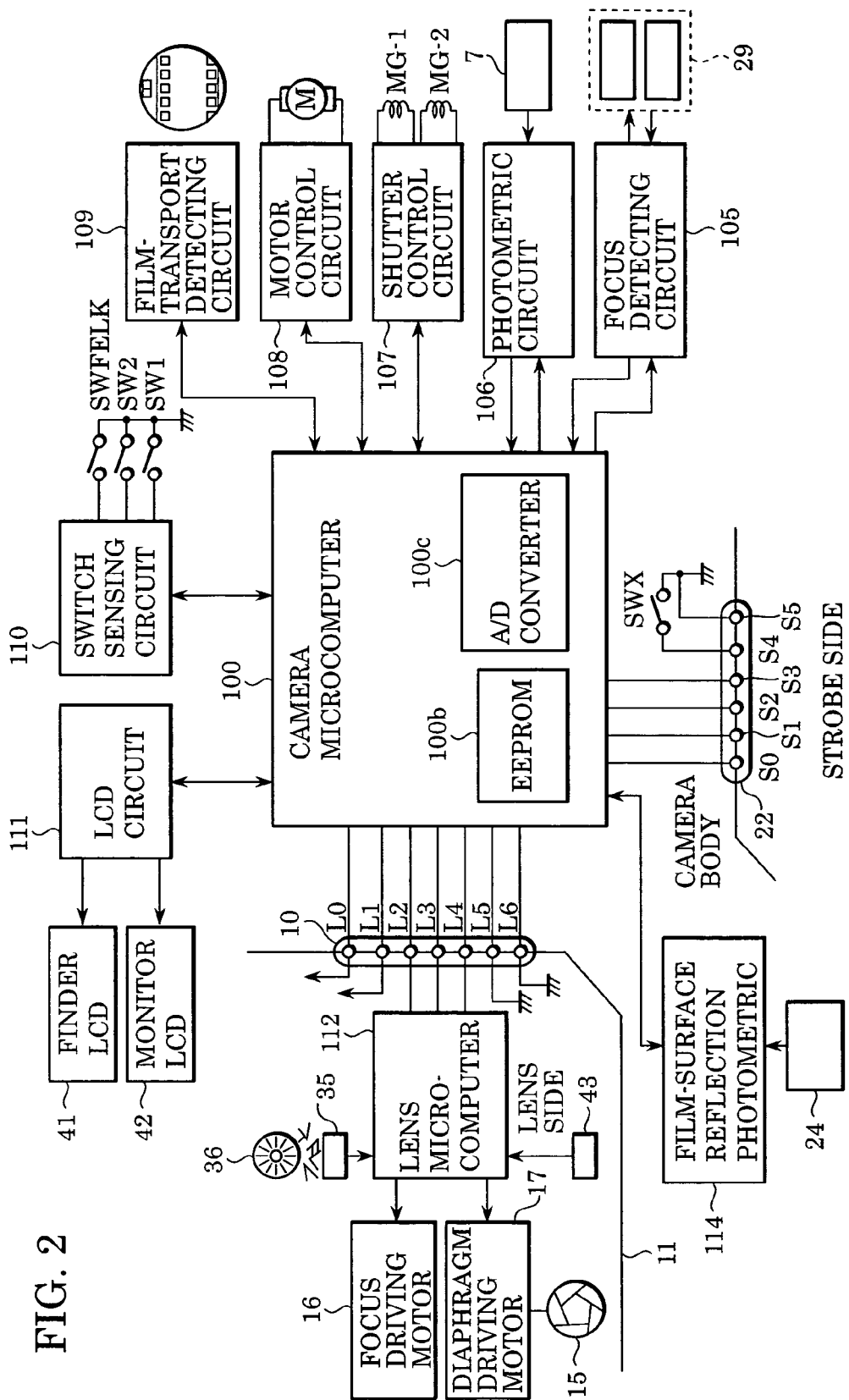
FIG. 2 is a block diagram of an example circuit block of a camera body and circuit block of objective taking lens groups according to the first embodiment.
Figure 3:
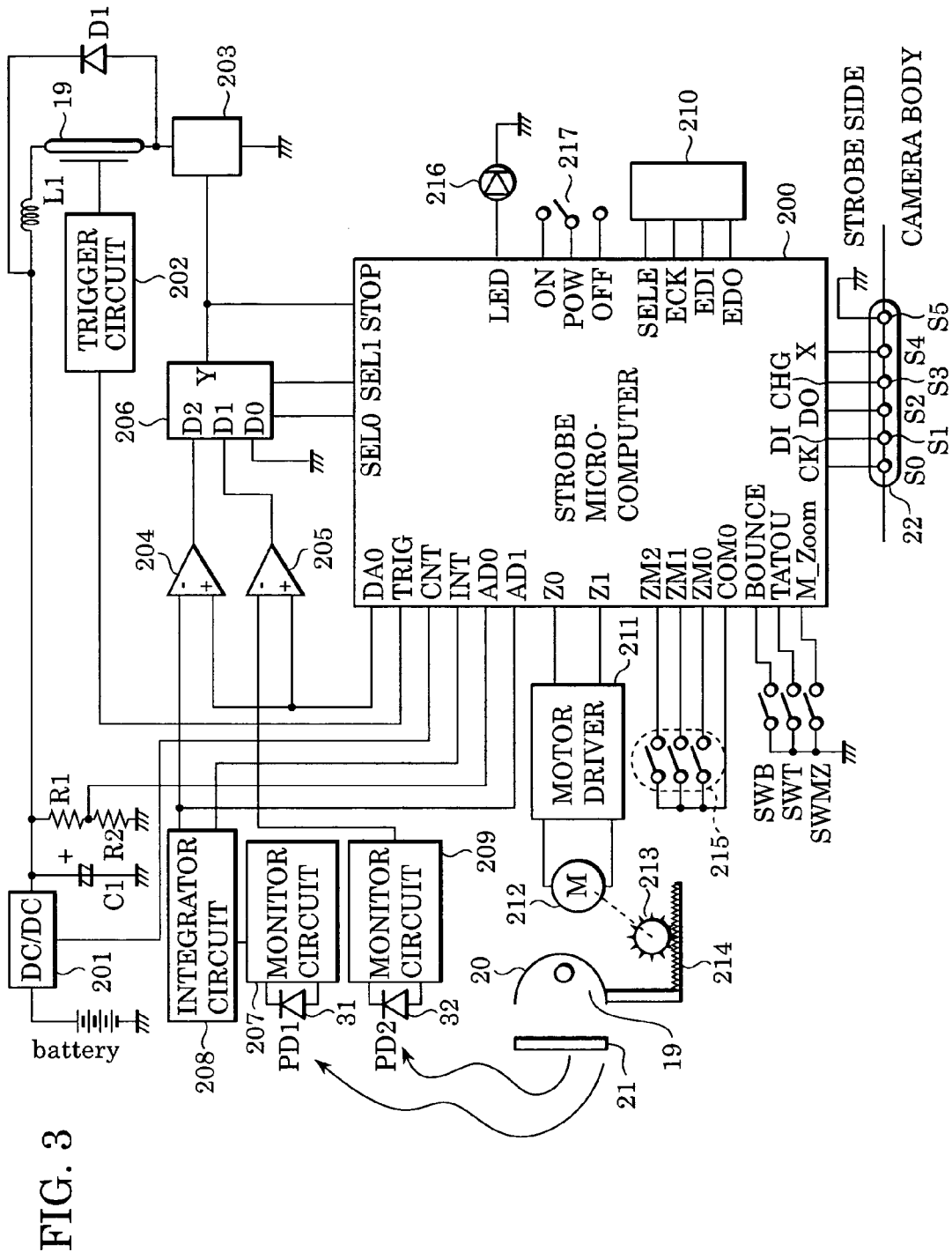
FIG. 3 is a circuit diagram of a strobe device according to the first embodiment.

FIGS. 2 and 3 show an example of electric circuit blocks of the strobe camera system of this embodiment. More specifically, FIG. 2 shows circuit blocks of the camera body 1 and the objective taking lens groups, and FIG. 3 shows a circuit block of the strobe device 18. In FIGS. 2 and 3, parts corresponding to those shown in FIG. 1 are denoted by the same reference numerals.

First, the circuit blocks of the camera body 1 and the objective taking lens groups will be described. A camera microcomputer 100 controls the operation of the camera body 1 according to predetermined software. An EEPROM 100b is a storage medium capable of storing a film counter and other photography information. An A/D converter 100c A/D-converts an analog signal from a focus detecting circuit 105 and a photometric circuit 106. The camera microcomputer 100 processes the A/D-conversion value in order to set various states.

The focus detecting circuit 105, the photometric circuit 106, a shutter control circuit 107, a motor control circuit 108, a film-transport detecting circuit 109, a switch sensing circuit 110, and a liquid crystal display circuit (LCD driving circuit) 111 are connected to the camera microcomputer 100. Signals are transmitted to the lens groups through the mount contact unit 10. Also, signals are transmitted to the strobe device 18 through the strobe contact unit 22 when the strobe device 18 is directly mounted on the camera body 1.

As describe above, the focus-detection line sensor 29 detects the focus state of the seven photometric areas A0 to A6 in the picture frame 400 in the finder 5, and is provided in pairs on the secondary image formation plane of the shooting optical system according to each distance measuring point.

The focus detecting circuit 105 performs accumulation control and read control of the focus-detection line sensor 29 in response to a signal from the camera microcomputer 100 and outputs pixel information converted in a photoelectric manner to the camera microcomputer 100. The camera microcomputer 100 A/D-converts the information and detects focus by using the known phase-difference detecting method. Also, the camera microcomputer 100 transmits/receives signals to/from a lens microcomputer 112, which is provided in the objective taking lens groups side, based on the focus-detection information obtained by detecting focus, in order to adjust the focus of the objective taking lens groups 12 to 14.

The photometric circuit 106 receives output from the multi-division photometric sensor 7. The output is regarded as brightness signals of the respective photometric areas A0 to A22 in the picture frame 400. Then, the photometric circuit 106 outputs the brightness signals to the camera microcomputer 100.

The photometric circuit 106 outputs the brightness signal to the camera microcomputer 100 in both states: a steady state where strobe light is not preliminarily emitted to a subject and a preliminary emission state where light is preliminarily emitted. Then, the camera microcomputer 100 A/D-converts the brightness signal output from the photometric circuit 106 and calculates an f-stop number and a shutter speed for adjusting exposure for shooting and the amount of light at actual light emission during exposure.

The shutter control circuit 107 operates a shutter leading curtain (MG-1) and a shutter trailing curtain (MG-2) to perform an exposure operation. The motor control circuit 108 controls a motor in accordance with a signal from the camera microcomputer 100 so as to move up/down the main mirror 2, charge the shutter 8, and transport the film. The film-transport detecting circuit 109 detects whether the film has been advanced by one frame and transmits the detection result to the camera microcomputer 100.

A switch SW1 is turned ON by a first stroke of a release button (not shown), which is operated by a photographer when light measurement or auto focus (AF) is started. A switch SW2 is turned ON by a second stroke of the release button, which is operated by the photographer when an exposure operation is started. A switch SWFELK is turned ON by a push switch (not shown), which is operated by the photographer for starting a lock operation after the amount of strobe light has been determined by preliminary light emission before an exposure operation.

Signals from the switches SW1, SW2, and SWFELK, and other camera operating members (not shown) are sensed by the switch sensing circuit 110, which transmits the signals to the camera microcomputer 100. A switch SWX is turned ON upon full-open of the shutter 8, and transmits a signal indicating the timing of actual light emission at exposure to the strobe side.

The LCD circuit 111 controls the display of a finder LCD 41 and the display of a monitor LCD 42 according to a signal from the camera microcomputer 100. A film-surface-reflection photometric circuit 114 outputs photometric information in the film-surface photometric sensor 24 to the camera microcomputer 100. Accordingly, the camera microcomputer 100 can obtain photometric information in the film-surface photometric sensor 24.

The film-surface photometric sensor 24 measures, as the multi-division photometric sensor 7, the brightness of the respective photometric areas A0 to A22, which are defined by dividing the picture frame 400 shown in FIG. 4 and which are associated with the picture frame 400.

Next, the configuration of the objective taking lens groups will be described. The camera body and the objective taking lens groups are electrically connected to each other via the lens mount contact unit 10. The lens mount contact unit 10 includes a contact L0 for a power supply of a focus driving motor 16 and a diaphragm driving motor 17, which are disposed in the lens barrel 11; a contact L1 for a power supply of the lens microcomputer 112; a contact L2 for a clock for performing known serial data communication; a contact L3 for transmitting data from the camera body to the objective taking lens groups; a contact L4 for transmitting data from the objective taking lens groups to the camera body; a ground contact L5 for a power supply for the motors (the focus driving motor 16 and the diaphragm driving motor 17); and a ground contact L6 for a power supply for the lens microcomputer 112.

The lens microcomputer 112 is connected to the camera microcomputer 100 via the lens mount contact unit 10, and operates the focus driving motor 16 and the diaphragm driving motor 17 in order to control the focus and the aperture of the objective taking lens groups 12 to 14.

Reference numerals 35 and 36 denote a photodetector and a pulse plate, respectively. The lens microcomputer 112 is capable of obtaining position information of the first lens group 12 by counting pulses. Also, the lens microcomputer 112 is capable of adjusting the focus of the objective taking lens groups 12 to 14 and transmitting information about the absolute distance to a subject to the camera microcomputer 100.

Next, the configuration of the strobe device 18 will be described with reference to FIG. 3. A strobe microcomputer 200 is a circuit for controlling the entire strobe device 18 according to signals from the camera microcomputer 100. Specifically, the strobe microcomputer 200 controls the amount of light to be emitted, the intensity of light of flat light emission, emission time, and emission angle.

A DC/DC converter 201 boosts the voltage of a battery in accordance with the instructions from the strobe microcomputer (control circuit) 200 and charges a main capacitor C1. Resistor dividers R1 and R2 are provided so that the strobe microcomputer 200 can monitor the voltage of the main capacitor C1. The strobe microcomputer 200 indirectly monitors the voltage across the main capacitor C1 by A/D-converting a divided voltage by an A/D converter included in the strobe microcomputer 200. Further, the strobe microcomputer 200 controls the operation of the DC/DC converter 201 based on the monitoring result, so as to control the voltage across the main capacitor C1 at a predetermined voltage.

A trigger circuit 202 outputs a trigger signal via the strobe microcomputer 200 in response to an SWX signal, which is generated by the instructions from the camera microcomputer 100 or when the transport of the shutter leading curtain is completed, for emitting light from the strobe device, and applies a high voltage of several thousand volts to a trigger electrode of the xenon tube 19. Accordingly, discharge of the xenon tube 19 is induced, so that the electric charge energy accumulated in the main capacitor C1 is emitted as a light energy through the xenon tube 19.

A light-emission control circuit 203 using a switching device, such as an IGBT (insulated gate bipolar transistor), is brought into conduction when a high voltage is applied to the trigger electrode at light emission of the strobe device, and applies a current to the xenon tube 19. In order to stop light emission of the strobe device 18, the light-emission control circuit 203 is brought out of conduction so that the current of the xenon tube 19 is interrupted.

Reference numerals 204 and 205 denote comparators. The comparator 204 is used for stopping flash emission, which will be described later. The comparator 205 is used for controlling the intensity of light at flat emission, which will be described later. A data selector 206 selects one of input terminals D0 to D2 in response to a selection signal output from an output terminal SEL0 or SEL1 of the strobe microcomputer 200 and outputs the signal to the light-emission control circuit 203 via a terminal Y.

A flash-emission controlling monitor circuit 207 logarithmically compresses the output of a photoreceptor 31 and amplifies it. An integrator circuit 208 integrates the output of the flash-emission controlling monitor circuit 207. A flat-emission controlling monitor circuit 209 amplifies the output of a photoreceptor 32. An EEPROM 210 is a storage unit for storing the above-mentioned flat emission time and so on.

The emission-angle (strobe zoom) adjusting mechanism 34 includes a motor driving circuit (motor driver) 211, a zoom driving motor 212, a pinion gear 213, a rack gear 214, and a zoom-position detecting encoder 215 for detecting the position of the reflector 20. An LED 216 indicates that the strobe device 18 is in an emission-standby state.

A switch SWB is used for judging whether the strobe device 18 is in a bounce mode. A switch SWT operates in conjunction with a multi-light setting button (not shown). When a photographer wants to perform a so-called multi-light shooting by using a plurality of strobe devices, the switch SWT operates in conjunction with the multi-light setting button, so that the strobe microcomputer 200 sets multi-light shooting.

A switch SWMZ operates in conjunction with a manual-zoom setting button (not shown). When a photographer is using a lens which cannot automatically detect focal length information or when the photographer wants to perform shooting for special effect by intentionally emitting strobe light at an angle different from an angle of view in order to locally emit the strobe light to a subject, he/she operates the manual-zoom setting button, whereby the switch SWMZ is operated in conjunction therewith. Then, the strobe microcomputer 200 operates the emission-angle adjusting mechanism 34 and sets an emission angle desired by the photographer.

Next, each terminal of the strobe microcomputer 200 will be described. CK denotes an input terminal of a synchronizing clock for performing serial communication with the camera body 1. DI denotes an input terminal of data transmitted by the serial communication. D0 denotes an output terminal of data transmitted by the serial communication. CHG denotes an output terminal for notifying the camera body 1 of the emission-standby status of the strobe device 18 in a form of current. X denotes an input terminal of an SWX signal, which is an emission timing signal from the camera body 1.

ECK denotes an output terminal for outputting a communication clock for performing serial communication with an EEPROM, which is a storage unit connected outside the strobe microcomputer 200, or the readable storage unit 210, such as an EEPROM or a flash ROM. EDI denotes an input terminal of serial data from the storage unit 210. ED0 denotes an output terminal of serial data to the storage unit 210. SELE denotes an enable terminal used for permitting communication with the storage unit 210, wherein "Lo" means enable and "Hi" means disable in the following description. In this embodiment, the storage unit 210 is provided outside the strobe microcomputer 200, but a function equivalent to the storage unit 210 may be provided inside the strobe microcomputer 200.

POW denotes an input terminal for inputting the status of a power switch 217. OFF denotes an output terminal for allowing the strobe device 18 to be turned off when being connected to the power switch 217. ON denotes an output terminal for allowing the strobe device 18 to be turned on when being connected to the power switch 217. When the power switch 217 is in an ON-state, the terminal POW is connected to the terminal ON. In this case, the terminal ON is in a high-impedance state and the terminal OFF is in a low-impedance state. On the other hand, when the power switch 217 is in an OFF-state, the terminal ON is in a low-impedance state and the terminal OFF is in a high-impedance state. LED denotes a display output terminal of the LED 216 for indicating an emission-standby state.

STOP denotes an input terminal of an emission stop signal, wherein "Lo" means an emission stop state. SEL0 and SEL1 denote output terminals for outputting the instructions of the input selection of the data selector 206. When a pair of selection signals output from the output terminals SEL0 and SEL1 is (SEL1, SEL0)=(0, 0), the input terminal D0 is connected to the terminal Y. When a pair of selection signals output from the output terminals SEL0 and SEL1 is (SEL1, SEL0)=(0, 1), the terminal D1 is selected. When a pair of selection signals output from the output terminals SEL0 and SEL1 is (SEL1, SEL0)=(1, 0), the input terminal D2 is selected.

DA0 denotes a D/A output terminal included in the strobe microcomputer 200, serving as a terminal for outputting the comparison level of the comparators 204 and 205 in an analog voltage. TRIG denotes an output terminal of a trigger signal for instructing the trigger circuit 202 to emit light. CNT denotes an output terminal for controlling the start/stop of oscillation of the DC/DC converter 201, wherein "Hi" means start of charge and "Lo" means stop of charge in the following description. INT denotes an integration starting terminal for controlling the start/reset of integration of the integrator circuit 208, wherein "Hi" means reset of integration and "Lo" means permission of integration.

AD0 and AD1 denote A/D input terminals, which are used for converting input voltage to digital data so as to be processed inside the strobe microcomputer 200. More specifically, the A/D input terminal AD0 is used for monitoring the voltage of the main capacitor C1 and the A/D input terminal AD1 is used for monitoring the integrated output voltage of the integrator circuit 208.

Z0 and Z1 denote control output terminals for controlling the motor driver 211, which drives the zoom driving motor 212. ZM0, ZM1, and ZM2 denote input terminals for inputting signals from the zoom-position detecting encoder 215. COM0 denotes a common terminal for leading a current equivalent to the ground level of the zoom-position detecting encoder 215.

BOUNCE denotes a terminal for inputting a signal indicating whether the strobe device 18 is in a bounce state. TATOU denotes a terminal for inputting the setting state of the switch for setting the above-mentioned multi-light shooting. M_Zoom denotes a terminal for inputting the setting state of the setting switch of manual zoom.

Next, the operation of the circuitry will be described by referring to each operation of the strobe device 18.

<Detection of Emission-Standby State>

A divided voltage of the main capacitor C1 is input to the strobe microcomputer 200 through the A/D input terminal AD0. The strobe microcomputer 200 A/D-converts the input voltage, and, by judging that the voltage of the main capacitor C1 has enough level for emitting light, the strobe microcomputer 200 gets a predetermined current from the output terminal CHG and notifies the camera body 1 that light can be emitted. Also, the strobe microcomputer 200 sets the terminal LED at "Hi" so as to allow the LED 216 to emit light and to indicate that the strobe device is in an emission-standby state.

On the other hand, if the voltage of the main capacitor C1 is below the predetermined level, the strobe microcomputer 200 sets the output terminal CHG to inactive so as to interrupt the current. Accordingly, the camera body 1 is notified that the strobe device 18 cannot emit light. Further, the strobe microcomputer 200 sets the terminal LED to "Lo" so as to shut off the LED 216 and to indicate that the strobe device cannot emit light.

<Setting of Strobe Emission Angle>

The strobe microcomputer 200 reads a current zoom position from the input terminals ZM0 to ZM2 and drives the motor driver 211 by outputting a predetermined signal to the motor driver 211 through the control output terminals Z0 and Z1 so as to set the zoom position instructed by the camera body 1 by serial communication. When the photographer manually sets the strobe emission angle by operating a manual zoom setting button (not shown), the strobe microcomputer 200 drives the motor driver 211 according to a signal input from the terminal M_Zoom so as to set a predetermined zoom position.

<Preliminary Flat Light Emission>

When the strobe device 18 is in an emission-standby state, the camera body 1 can provide instructions of preliminary emission while transmitting the intensity of light and emission time of the preliminary emission. The strobe microcomputer 200 sets a predetermined voltage at the D/A output terminal DA0 according to a predetermined light intensity signal from the camera body 1. Then, the strobe microcomputer 200 outputs "Lo" and "Hi" to the output terminals SEL1 and SEL0, respectively, and selects the terminal D1. At this time, the xenon tube 19 has not yet emitted light, so that the photocurrent of the photoreceptor 32 hardly flows and that the output of the monitor circuit 209 is not generated at the inverting input terminal of the comparator 205. Further, since the output of the comparator 205 is "Hi", the light-emission control circuit 203 is brought into conduction. Then, after a trigger signal is output from the trigger-signal output terminal TRIG, the trigger circuit 202 generates a high voltage and excites the xenon tube 19, so as to start light emission.

On the other hand, the strobe microcomputer 200 instructs the integrator circuit 208 to start integration after a predetermined time period from the generation of the trigger signal. Accordingly, the integrator circuit 208 starts to integrate the output from the monitor circuit 207, that is, the logarithmically-compressed photoelectric output of the photoreceptor 31 for integrating the amount of light, and at the same time, starts a timer for counting predetermined time.

After preliminary light emission has started, the amount of photocurrent of the photoreceptor 32 for controlling the intensity of flat light emission increases and the output of the monitor circuit 209 increases. When the output voltage of the monitor circuit 209 surpasses the predetermined comparison voltage set at the noninverting input terminal of the comparator 205, the output of the comparator 205 is inverted to "Lo." Accordingly, the light-emission control circuit 203 interrupts the light emission current of the xenon tube 19, so that a discharge loop is interrupted. However, after a ring current loop has been formed by a diode D1 and a coil L1 and overshoots due to delay of the circuit has been resolved, the light emission current gradually decreases. Since the intensity of light decreases as the light emission current decreases, the current flowing through the photoreceptor 32 decreases and the output of the monitor circuit 209 is lowered. When the output voltage of the monitor circuit 209 decreases below a predetermined comparison level, the output of the comparator 205 is inverted to "Hi" again.

Accordingly, the light-emission control circuit 203 is brought into conduction again, a discharge loop of the xenon tube 19 is formed, and the light emission current and the intensity of light increases. In this way, the comparator 205 repeatedly increases and decreases the intensity of light at short intervals based on the predetermined comparator voltage set to the D/A output terminal DA0. As a result, flat light emission can be realized, where light emission can be continued with a substantially steady light intensity.

After predetermined preliminary emission time has been elapsed on the above-mentioned emission-time timer, the strobe microcomputer 200 sets the output terminals SEL1 and SEL0 to "Lo" and "Lo," respectively. Accordingly, the input terminal D0 (input of Lo level) is selected in the data selector 206. Accordingly, the output of the data selector 206 is forcefully set to Lo level, and the light-emission control circuit 203 interrupts the discharge loop of the xenon tube 19, so that the light emission of the strobe device 18 is finished.

When the light emission of the strobe device 18 is finished, the strobe microcomputer 200 reads the output of the integrator circuit 208, which has integrated preliminary light emission, from the A/D input terminal AD1 and A/D-converts it, in order to read the integration value, that is, the amount of light at the preliminary emission in a digital value (INTp).

<Control of Actual Light Emission>

The camera microcomputer 100 calculates a correct relative value (γ) of the amount of light at actual emission with respect to that at preliminary emission based on the brightness of the light reflected by a subject, which is transmitted from the multi-division photometric sensor 7 at preliminary emission. Then, the camera microcomputer 100 transmits the correct relative value (γ) to the strobe microcomputer 200.

The strobe microcomputer 200 calculates a correct integration value (INTm) by multiplying the integration value at preliminary emission (INTp) by the correct relative value (γ) from the camera body 1, and sets the correct integration value (INTm) to the D/A output terminal DA0.

Then, the strobe microcomputer 200 outputs a high-level signal "Hi" and a low-level signal "Lo" to the output terminals SEL1 and SEL0, respectively, and selects the terminal D2. At this time, the integrator circuit 208 cannot operate, so that output of the integrator circuit 208 is not generated at the inverting input terminal of the comparator 204. Further, since the output of the comparator 204 is at a high level (Hi), the light-emission control circuit 203 is brought into conduction.

Then, when a trigger signal is output from the trigger-signal output terminal TRIG, the trigger circuit 202 generates a high voltage so as to excite the xenon tube 19. Accordingly, light emission of the strobe device 18 is started. Also, the strobe microcomputer 200 sets the integration starting terminal INT to a low level (Lo) after trigger noise caused by the applied trigger signal has disappeared and after several tens of μ seconds has elapsed after actual light emission is started. Accordingly, the integrator circuit 208 integrates the output from the sensor 31 via the monitor circuit 207. When the integration output reaches a predetermined voltage set to the D/A output terminal DA0, the comparator 204 is inverted, so that the light-emission control circuit 203 is brought out of conduction via the data selector 206. Accordingly, light emission of the strobe device 18 is stopped. On the other hand, the strobe microcomputer 200 monitors the terminal STOP. When the signal level of the input terminal STOP is inverted and the light emission of the strobe device 18 is stopped, the strobe microcomputer 200 sets the output terminals SEL1 and SEL0 to "Lo" and "Lo" ((0, 0)), respectively, forcefully sets an emission-forbidden state, inverts the integration starting terminal INT, ends integration, and ends the light emission process. In the above-described manner, the light amount can be adequately controlled at actual light emission.

Next, an example of the operation of the strobe camera system according to this embodiment will be described with reference to FIGS. 6 and 7. Herein, the operation of the camera microcomputer 100 will be mainly described.

<Step S101>

Figure 6:
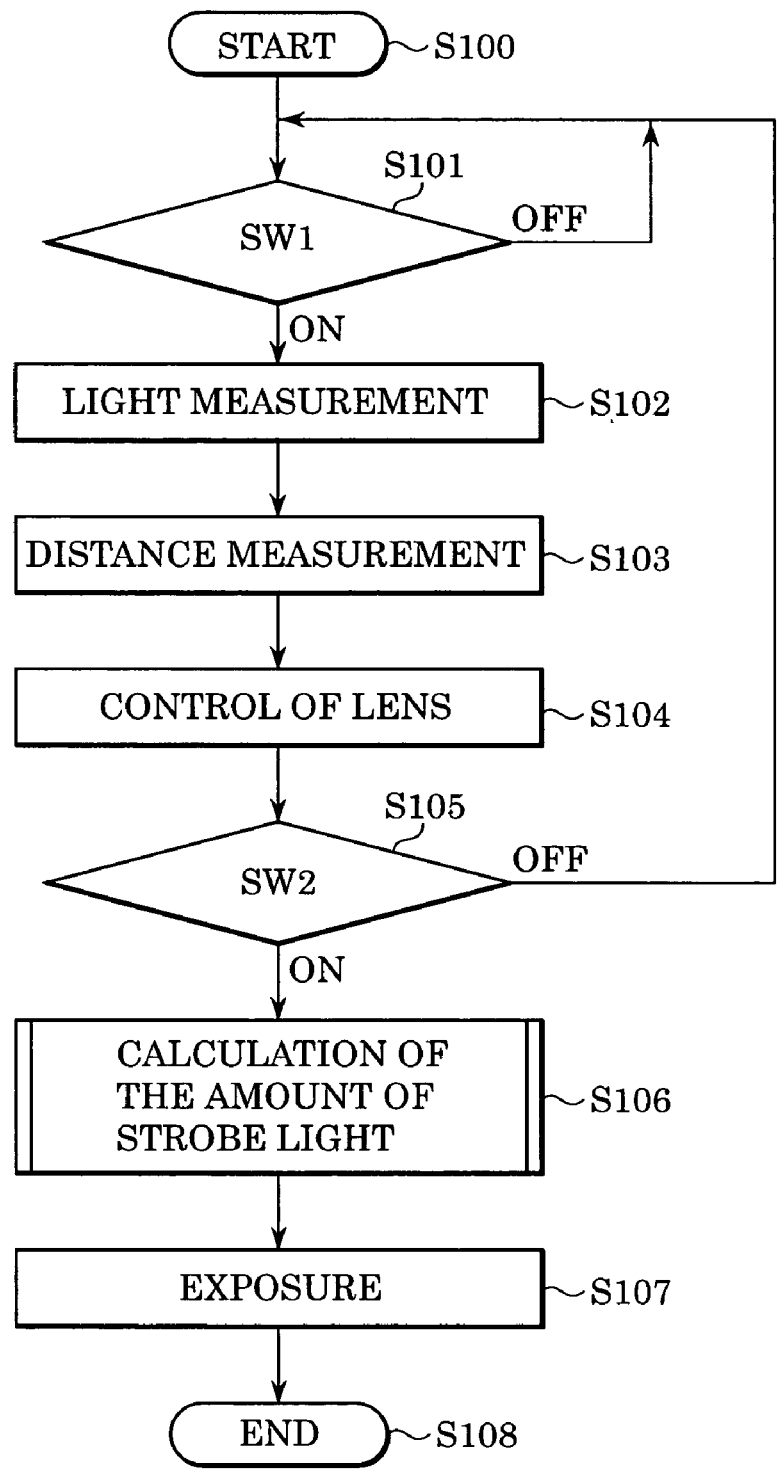
FIG. 6 is a flowchart illustrating an example operation of the strobe camera system according to the first embodiment.
Figure 7:
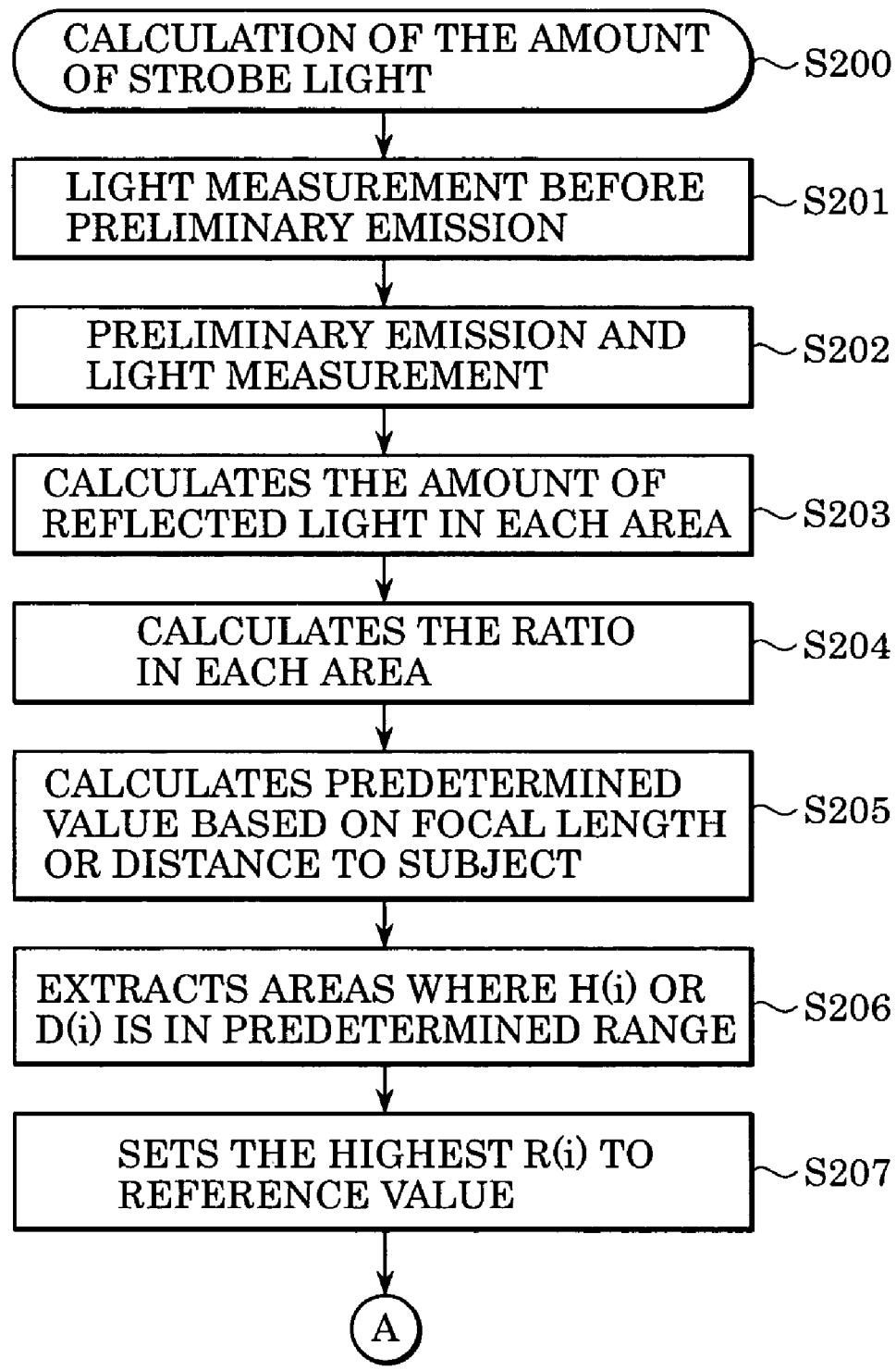
FIG. 7 is a flowchart specifically illustrating an example process of calculating the amount of light to be emitted from the strobe device according to the first embodiment.

Referring to FIG. 6, after the operation of the camera has started, the camera microcomputer 100 first determines whether the switch SW1, which is turned on by a first stroke of the release button, is in an ON-state. This step is repeated until the switch SW1 is turned on, and the process proceeds to step S102 after the switch SW1 has been turned on.

<Step S102>

The camera microcomputer 100 obtains information about the subject brightness in the plurality of photometric areas A0 to A22 in the picture frame 400 from the above-mentioned photometric circuit 106 by A/D conversion. Based on the information about the subject brightness, the shutter speed and the f-stop number used for exposure (to be described later) are calculated.

<Step S103>

The camera microcomputer 100 drives the focus detecting circuit 105 in order to detect the focus by using the known phase-difference detecting method. As described above, there are a plurality of points for which the focus is to be detected (distance-measurement points). Therefore, the focus is detected by using a method in which a photographer can arbitrarily set a distance-measurement point or a method using a known automatic selection algorithm based on close-point priority.

<Step S104>

The camera microcomputer 100 adjusts the focus of the objective taking lens groups 12 to 14 by communicating with the lens groups so that the selected point is focused on. Incidentally, the camera microcomputer 100 can obtain information about the absolute distance of the focus position of the objective taking lens groups 12 to 14 by communicating with the lens groups.

<Step S105>

The camera microcomputer 100 determines whether the switch SW2, which is turned on by a second stroke of the release button, is in an ON-state. If the switch SW2 is in an OFF-state, steps S101 to S104 are repeated. If the switch SW2 is in an ON-state, the process proceeds to step S106 so that a release operation is performed.

<Step S106>

In the release operation, a subroutine for calculating the amount of light of the strobe device 18 is called.

Now, an example of a process for calculating the amount of light of the strobe device 18 will be described in detail with reference to FIG. 7.

<Step S201>

The camera microcomputer 100 obtains information about the subject brightness from the photometric circuit 106 just before preliminary emission. The brightness P(i)

(i=0 to 22) is stored in the RAM for the respective photometric areas A0 to A22. The brightness P(i) is a logarithmically compressed (log-compressed) value, and increases by 1 when the brightness doubles.

<Step S202>

The camera microcomputer 100 instructs the strobe device 18 to perform preliminary emission. In response to the instructions, the strobe microcomputer 200 performs preliminary emission in the above-described manner. The camera microcomputer 100 obtains information about the subject brightness from the photometric circuit 106 during the preliminary flat light emission. The brightness H(i) (i=0 to 22) is stored in the RAM for the respective photometric areas A0 to A22. The brightness H(i) is also a logarithmically-compressed (log-compressed) value.

<Step S203>

The camera microcomputer 100 extracts the brightness D(i) of reflected light at the preliminary emission from the brightness P(i) just before the preliminary emission and the brightness H(i) at the preliminary emission. Specifically, the camera microcomputer 100 calculates the brightness D(i) by using the following Equation 1 and stores the calculated brightness D(i) in the RAM.

$$D(i)=\log_2(2^{H(i)}-2^{P(i)}); i=0 \text{ to } 22 \quad \text{(Equation 1)}$$

Herein, each of the brightness P(i) just before the preliminary emission and the brightness H(i) at the preliminary emission is a compressed value. Therefore, power of the brightness P(i) and H(i) is obtained and expanded, and the difference therebetween is obtained. Then, the difference is logarithmically compressed (log-compressed) to obtain the brightness D(i).

<Step S204>

The camera microcomputer 100 calculates the ratio R(i) of the brightness before the preliminary emission to that at the preliminary emission of the respective photometric areas A0 to A22. Specifically, the camera microcomputer 100 calculates the ratio R(i) of the brightness by using the following Equation 2 and stores the calculated ratio R(i) of the brightness in the RAM.

$$R(i)=H(i)-P(i); i=0 \text{ to } 22 \quad \text{(Equation 2)}$$

Herein, each of the brightness P(i) just before the preliminary emission and the brightness H(i) at the preliminary emission is a compressed value, so that the difference between these brightness values is equivalent to the ratio between them.

The reason why the ratio must be calculated is as follows. Assuming that a subject in the photometric areas A0 to A22 in the picture frame 400 is evenly exposed to a light source in an atmosphere before preliminary emission, the brightness in each of the photometric areas A0 to A22 is proportional to the reflectivity of the subject. When preliminary emission is performed under this condition, the light reflected by the subject is proportional to the negative square of the distance and also to the reflectivity of the subject. That is, by calculating the ratio of the brightness before preliminary emission to the brightness at preliminary emission in the respective photometric areas A0 to A22, a value proportional to the negative square of the distance to the subject can be obtained. Therefore, among the photometric areas A0 to A22, areas having the same ratio R(i) of brightness are at the same distance from the subject. In this way, examining the distribution of areas at the same distance from the subject among the photometric areas A0 to A22 in the picture frame 400 is a feature of this embodiment.

<Step S205>

The camera microcomputer 100 calculates predetermined values LVL0 and LVL1 based on information about the distance to the subject. Specifically, the predetermined value LVL0 is calculated by using the following Equation 3.

$$LVL0=-\text{Log}_2(D)\times 2+C2 \quad \text{(Equation 3)}$$

The predetermined value LVL0 is calculated by obtaining information D about the absolute distance to the subject from the lens microcomputer 112 and estimating the reflection brightness of a subject having a standard reflectivity at that distance. In Equation 3, C2 is a value depending on the amount of light and so on at preliminary emission and is set so that the predetermined value LVL0 is a little higher than the reflection brightness of a subject having a standard reflectivity at the distance information D. This is because the distance information D has a slight error and width and thus the value LVL0 is increased according to the error so that the reflection brightness of the subject having a standard reflectivity at preliminary emission does not become higher than the predetermined value LVL0. The predetermined value LVL0 is also a compressed value.

On the other hand, the predetermined value LVL1 is calculated by using the following Equation 4.

$$LVL1=LVL0-C3 \quad \text{(Equation 4)}$$

In Equation 4, C3 is set by considering the error and width of the distance information D so that the reflected light of the subject having a standard reflectivity at preliminary emission is not below the predetermined value LVL1. The predetermined value LVL1 is also a compressed value.

In this way, the amount of light for actual emission is calculated based on the distance information D assuming that light reflected by the subject at preliminary emission is between the predetermined values LVL0 and LVL1. If the distance information D is very correct, the amount of light to be emitted from the strobe device 18 at actual emission may be determined in a flashmatic manner based on the distance information D without setting the width. However, the following calculation is required since the actual distance information D of a subject includes an error and width (resolution of distance).

When information about the absolute distance to a subject is unknown in the system, the predetermined value LVL0 is expressed in the following Equation 5.

$$LVL0=\text{table1}(f) \quad \text{(Equation 5)}$$

Figures 8, 9:
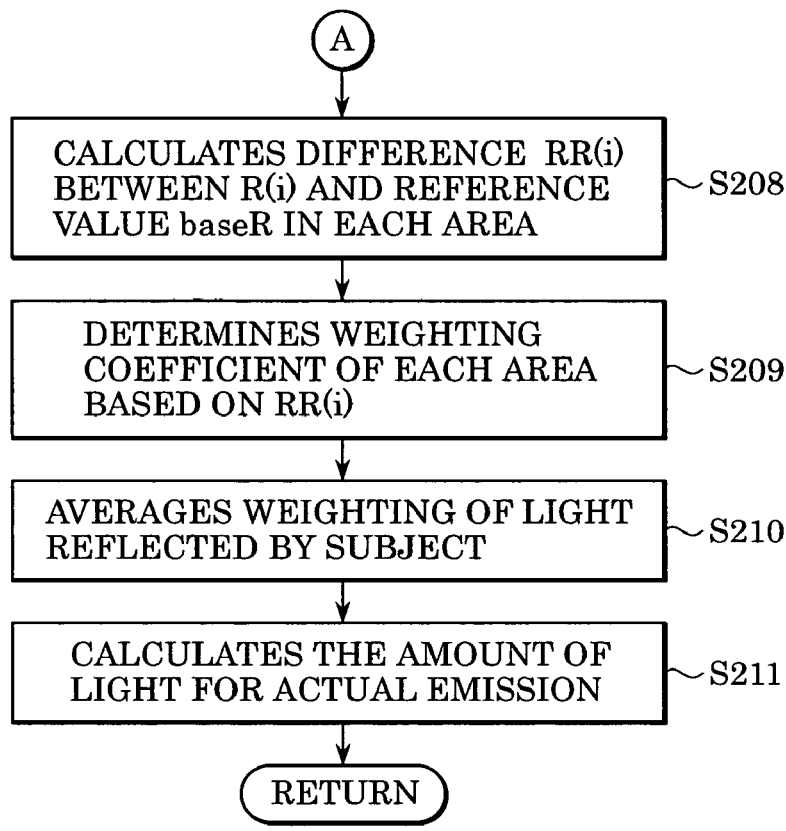
FIG. 8 is a flowchart continued from the flowchart shown in FIG. 7.
FIG. 9 is a table showing an example relationship between a focal length and a predetermined value defining the lower limit of reflected light at preliminary light emission according to the first embodiment.

In Equation 5, f is a focal length. "table1" means the table 900 shown in FIG. 9.

For example, in an objective taking lens having a focal length of 28 mm, the reflection brightness obtained when a subject having a standard reflectivity exists at a distance of 0.5 m is set to LVL0. This is based on an assumption that the brightness of light reflected by the subject at preliminary emission must be lower than the predetermined value LVL0 because a subject at a distance under 0.5 m cannot be shot by the lens of this focal length. Likewise, in an objective taking lens having a focal length of 50 mm, the reflection brightness obtained when a subject having a standard reflectivity exists at a distance of 0.8 m is set to LVL0. Also, in an objective taking lens having a focal length of 85 mm, the reflection brightness obtained when a subject having a standard reflectivity exists at a distance of 1.1 m is set to LVL0. That is, the subject must exist at a distance farther than the above distance in each case, so that the brightness of the light reflected by the subject at preliminary emission must be lower than the predetermined value LVL0.

On the other hand, when information about the absolute distance to a subject is unknown in the system, the predetermined value LVL1 is expressed in the following Equation 6.

$$LVL1 = LVL0 - C1 \quad \text{(Equation 6)}$$

In Equation 6, C1 is determined based on an assumption that the brightness of the light reflected by the subject is rarely below the predetermined value LVL1. For example, in an objective taking lens of a focal length of 50 mm, if the probability that the subject is at a distance of 3.2 m or farther is low, the brightness of light reflected by the subject is lowered by six stages at an 8-times distance (6.4÷0.8=8), so that C1 is 6.

<Step S206>

The camera microcomputer 100 extracts only an area/areas where the brightness D(i) is between the above-described predetermined values LVL0 to LVL1 from among the photometric areas A0 to A22. Accordingly, areas where the brightness D(i) is very high due to regular reflection from glass and areas where the brightness D(i) is very low due to an insufficient amount of strobe light are eliminated, and areas where the main subject is likely to exist are extracted from among the photometric areas A0 to A22. In many cases, the brightness H(i) at preliminary emission is not so much different from the brightness D(i) (the brightness P(i) just before preliminary emission is lower), and thus the brightness H(i) at preliminary emission may be used in this case.

<Step S207>

In the areas extracted from among the photometric areas A0 to A22 in the above-described manner, the nearest subject is most likely to be the main subject. Therefore, the highest ratio R(i) of the brightness P(i) just before preliminary emission to the brightness H(i) at preliminary emission is regarded as a reference value baseR, and the subject existing in an area/areas where the ratio R(i) of the brightness is equal to the reference value baseR is assumed to be the main subject.

<Step S208>

The camera microcomputer 100 calculates the difference RR(i) between the ratio R(i) of brightness and the reference value baseR in each of the photometric areas A0 to A22 by using the following Equation 7.

$$RR(i) = baseR - R(i); i=0 \text{ to } 22 \quad \text{(Equation 7)}$$

Since the reference value baseR and the brightness ratio R(i) are compressed values, the ratio between the photometric area at a reference distance (photometric area of the reference value baseR) and each of the other photometric areas is actually calculated by using Equation 7. A photometric area having a small RR(i) includes a subject which is positioned at a distance equivalent to the assumed main subject. In contrast to this, as the value RR(i) positively increases in the photometric areas, the subject therein is farther than the assumed main subject. On the contrary, as the value RR(i) negatively increases in the photometric areas, the subject therein is nearer than the assumed main subject. That is, in this case, the value RR(i) obtained from Equation 7 indicates an abnormal value because the subject is an obstacle or due to regular reflection from glass.

<Step S209>

A weighting coefficient W(i) in each of the photometric areas A0 to A22 is calculated by using the following Equation 8 based on the value RR(i) obtained from Equation 7.

$$W(i) = table2(RR(i)); i=0 \text{ to } 22 \quad \text{(Equation 8)}$$

In Equation 8, "table2" indicates the table 1000 shown in FIG. 10. In the table 1000 shown in FIG. 10, the weighting coefficient W(i) is 12 (highest) when RR(i) is zero (0). This is natural because the photometric area having an RR(i) of zero (0) includes the assumed main subject. On the other hand, as RR(i) increases from 0.4, 0.6, . . . , to 2.0, the area becomes farther from the area including the assumed main subject, and thus the weighting coefficient W(i) decreases from 11, 10, . . . , to 0. In this way, by gradually decreasing the weighting coefficient W(i), variation of strobe exposure caused by a subject which moves at each shooting can be prevented as much as possible. If a subject has depth, by weighting a portion at a depth as well as a portion at a shallow depth so as to perform averaging, the strobe light reaches the portion at the depth and a good picture can be taken.

RR(i) is a negative value, the abnormal value is due to an obstacle or regular reflection from glass. Therefore, the value of the weighting coefficient W(i) is lowered. However, the weighting coefficient W(i) is not sharply lowered in order to avoid the variation of strobe exposure. Herein, note that photometric areas where the main subject is not likely to exist are eliminated from the target of calculation in step S206, but the weighting coefficient W(i) is determined for all the photometric areas A0 to A22 in the picture frame 400.

<Step S210>

Weighting of light reflected by the subject is averaged by using the following Equation 9.

$$AVE = \Sigma(D(i) \times W(i))/\Sigma W(i); i=0 \text{ to } 22 \quad \text{(Equation 9)}$$

In this weighting operation, the main subject is extracted from the photometric areas at the same distance from the camera and the main subject is greatly weighted. Accordingly, the brightness of the light reflected from the subject can be calculated.

<Step S211>

The amount of light to be emitted at actual emission is calculated by using the following Equation 10.

$$\gamma = TARGET - AVE \quad \text{(Equation 10)}$$

Herein, "TARGET" is a target amount of light for sufficiently exposing a film surface. "γ" is a correct relative value of the amount of light at actual emission to the amount of light at preliminary emission. The relative value γ is transmitted from the camera microcomputer 100 to the strobe microcomputer 200.

<Step S107>

Referring back to FIG. 6, the camera microcomputer 100 performs exposure. That is, the camera microcomputer 100 raises the main mirror 2 and removes the main mirror 2 together with the sub-mirror 25 from the shooting optical path. Then, the camera microcomputer 100 controls the objective taking lens groups 12 to 14 so as to control the diaphragm and to control the shutter control circuit 107 to set a predetermined shutter speed (TV). At this time, the switch SWX is turned ON in synchronization with full-open of the shutter. Accordingly, a signal indicating the emission timing of actual emission at exposure is transmitted to the strobe device 18. The strobe device 18 receives instructions of actual emission by receiving the signal indicating the emission timing.

The strobe microcomputer 200 controls the actual light emission in the above-described manner in order to emit a correct amount of light based on the correction value γ transmitted from the camera. Finally, the main mirror 2 and so on removed from the shooting optical path is brought down and is positioned in a slanting direction in the shooting optical path, and then the film is advanced by one frame by the motor control circuit 108 and the film-transport detecting circuit 109.

Figure 5A:
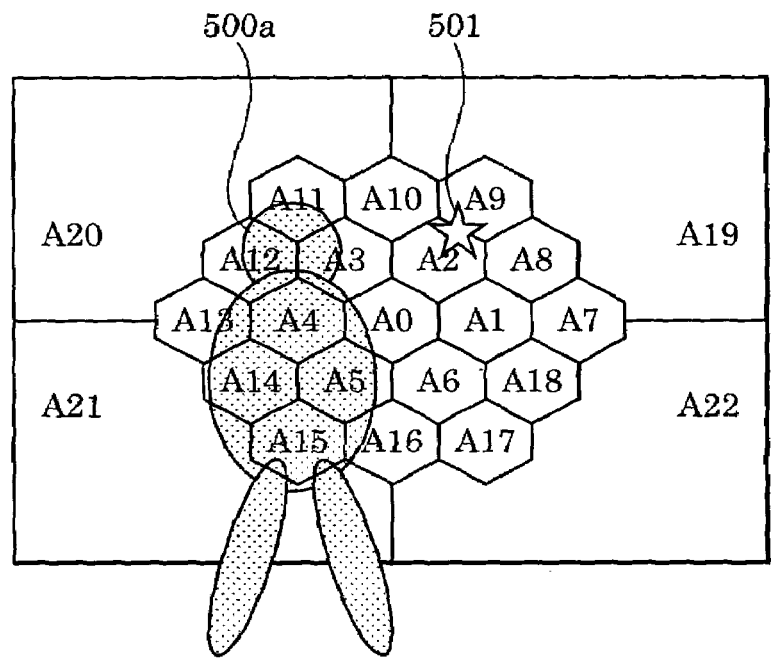
FIGS. 5A and 5B show examples of a subject existing in the picture frame consisting of the plurality of photometric areas according to the first embodiment.

The advantages of this embodiment will be described with reference to FIGS. 5A and 5B. In a shooting scene shown in FIG. 5A, a main subject 500a exists in the photometric areas A15, A14, and A4, and regular reflection from glass 501 exists in the photometric area A2. In the above-described steps S205 and S206 in FIG. 7, D(i) (brightness of reflected light at preliminary emission) in the photometric area A2 is larger than the predetermined value LVL0, and thus the photometric area A2 is eliminated from prospective areas to be extracted as the main subject. Then, in step S207, R(i) (the ratio between the brightness P(i) just before preliminary emission and the brightness H(i) at preliminary emission) in the photometric area A15 is set to the reference value baseR. Further, RR(i) (difference between R(i) and baseR) in the photometric areas A15, A14, and A5 is almost zero (0). Therefore, in a weighting operation, these three photometric areas A15, A14, and A5 are greatly weighted, and the brightness of light reflected from the subject is calculated. Accordingly, the amount of strobe light to be emitted to the main subject 500a can be adequately controlled.

Figure 5B:
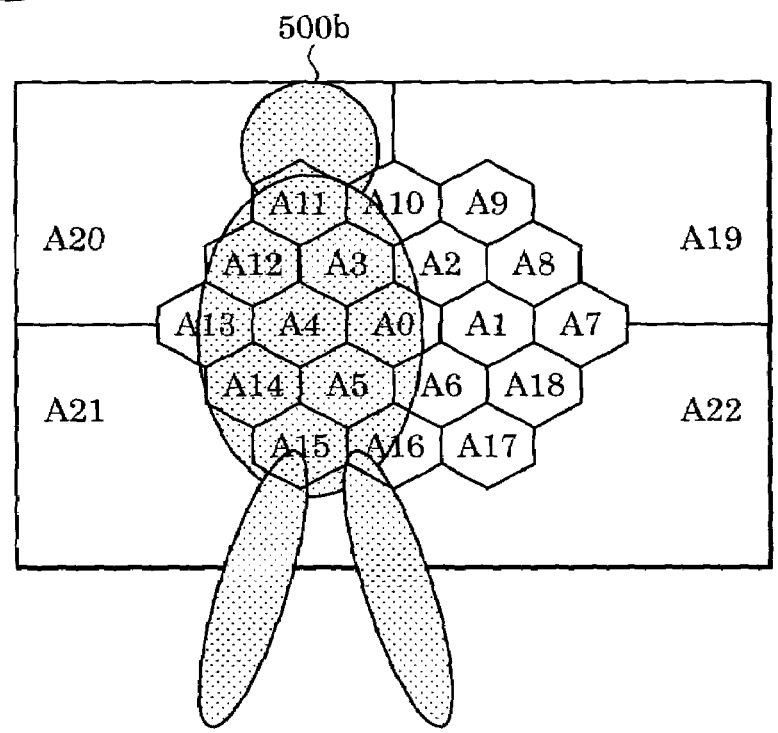

In a shooting scene shown in FIG. 5B, a main subject 500b exists in the photometric areas A3, A4, A5, A11, A12, A14, and A15. In this shooting scene, RR(i) in the photometric areas A3, A4, A5, A11, A12, A14, and A15 is almost zero (0) and these seven areas are mainly weighted, so that the brightness of light reflected from the subject is calculated. Accordingly, the amount of strobe light to be emitted to the main subject 500b can be adequately controlled.

In this embodiment, a main subject is extracted and weighting is averaged without being affected by the position and size of the subject in the picture frame 400. Therefore, the amount of strobe light to be emitted can be controlled in a highly reliable manner.

Second Embodiment

Next, a second embodiment of the present invention will be described. The second embodiment is different from the first embodiment in part of the process of calculating the amount of light to be emitted from the strobe device 18. Therefore, parts which are the same as those in the first embodiment are denoted by the same reference numerals in FIGS. 1 to 10, and the corresponding description will be omitted.

Figure 11:
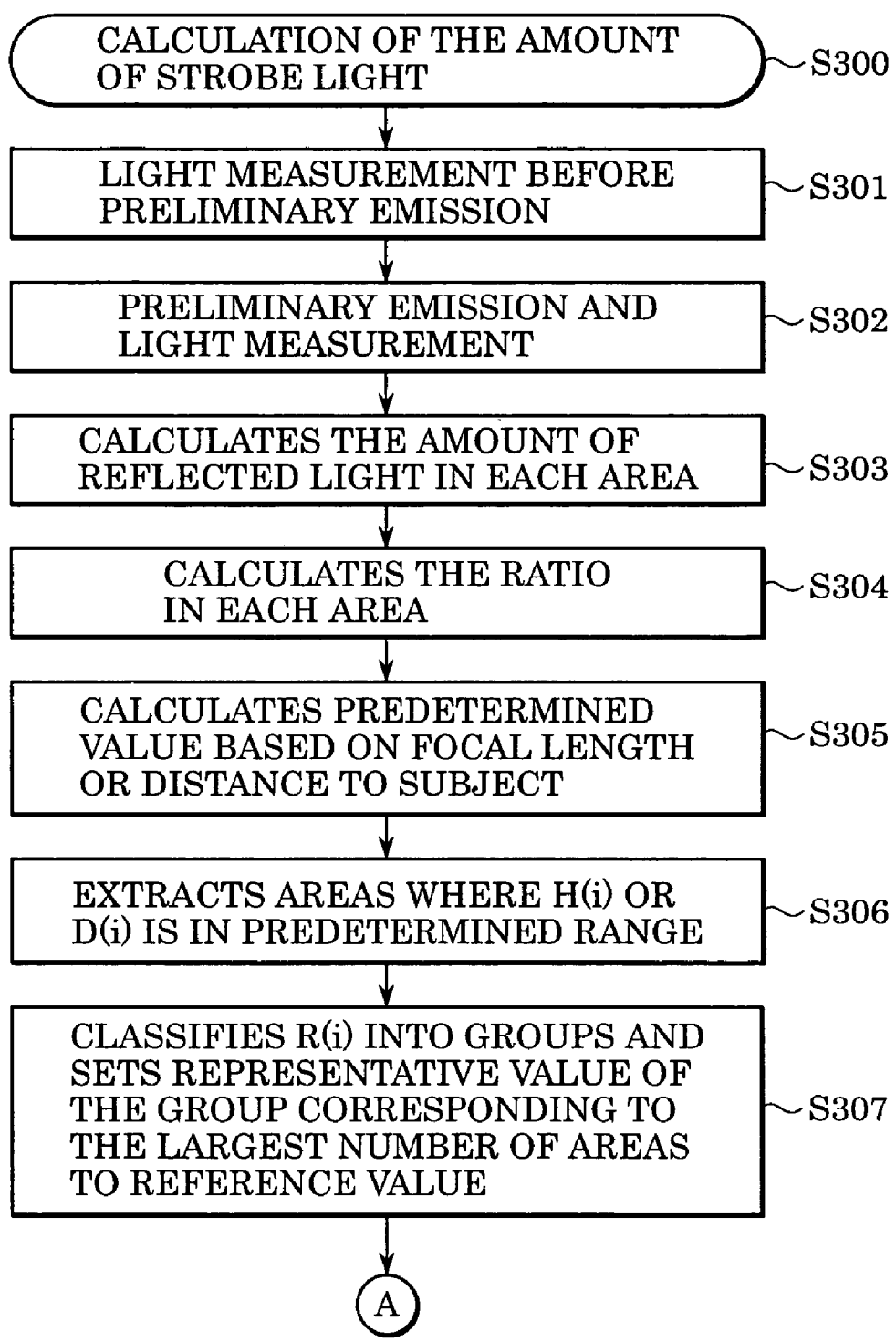
FIG. 11 is a flowchart specifically illustrating an example process of calculating the amount of light to be emitted from the strobe device according to a second embodiment of the present invention.

FIG. 11 is a flowchart showing an example of a process in a subroutine of calculating the amount of strobe light. The flowchart shown in FIG. 11 is partially different from the flowchart shown in FIG. 7, but steps S301 to S306 are the same as steps S201 to 206 in FIG. 7.

<Step S307>

The range of ratio R(i) between the brightness P(i) just before preliminary emission and the brightness H(i) at preliminary emission is classified into a plurality of groups according to its value, and the representative value of a group corresponding to the largest number of areas is set to a reference value. For example, the range of the ratio R(i) between the brightness P(i) just before preliminary emission and the brightness H(i) at preliminary emission is classified into groups in units of 0.5 stages and a group corresponding to the largest number of areas is determined.

In the shooting scene shown in FIG. 5B, the ratio R(i) between the brightness P(i) just before preliminary emission and the brightness H(i) at preliminary emission is in the range of 6.75 to 7.25 in the seven photometric areas A3, A4, A5, A11, A12, A14, and A15. Also, the ratio R(i) between the brightness P(i) just before preliminary emission and the brightness H(i) at preliminary emission is in the range of 5.75 to 6.25 in the two photometric areas A13 and A0.

In this way, the range of the ratio R(i) between the brightness P(i) just before preliminary emission and the brightness H(i) at preliminary emission is classified into groups according to its value, and the number of areas corresponding to each group is checked. In this case, the ratio R(i) between the brightness P(i) just before preliminary emission and the brightness H(i) at preliminary emission is in the range of 6.75 to 7.25 in the seven photometric areas A3, A4, A5, A11, A12, A14, and A15, and thus the subject covering these seven areas is assumed to be the main subject. That is, the subject which occupies a largest area in the picture frame is assumed to be the main subject. The calculation method thereafter is the same as in the first embodiment.

In the second embodiment, a subject which occupies a largest area in the picture frame rather than a subject which is nearest to the camera is regarded as a main subject, and then the amount of light to be emitted from the strobe device 18 is controlled. Accordingly, the amount of strobe light can be controlled highly reliably as in the first embodiment.

In the first and second embodiments, a silver-halide camera for exposing a film has been described. The same advantages as in the first and second embodiments can also be obtained by adopting an electronic camera for forming an image by an imager, such as a charge coupled device (CCD) or a CMOS sensor, performing an exposure operation, and recording a captured image. Of course, the control of the amount of emitted light described in the first and second embodiments can be applied to a digital still camera.

In the first and second embodiments, flash light is emitted at actual emission. Likewise, the control of the amount of emitted light described in the first and second embodiments can be applied when flat emission of maintaining a constant wave height is performed. Also, the control of the amount of emitted light described in the first and second embodiments can be applied when the camera body 1 includes the strobe device 18 therein, instead of being externally attached.

Other Embodiments

In order to operate the various devices to realize the function of the above-described embodiments, program code of software for realizing the function of the above-described embodiments may be supplied to a computer in an apparatus connected to the various devices or in the system, and the various devices may be operated according to the program stored in the computer (CPU or MPU) in the system or the apparatus.

In this case, the program code of the software realizes the function of the above-described embodiments. Therefore, the program code and a unit for supplying the program code to the computer, such as a recording medium storing the program code constitute the present invention. Examples of the recording medium for storing the program code include a flexible disk, a hard disk, an optical disk, a magneto-optical disk, a CD-ROM, a magnetic tape, a nonvolatile memory card, and a ROM.

Of course, the program code is included in the embodiments of the present invention not only when the function of the above-described embodiments is realized by executing the program code supplied to the computer but also when the function of the above-described embodiments is realized by the program code in cooperation with the operating system (OS) operating in the computer or another application software.

Further, after the supplied program code has been stored in a memory included in an expansion board of the computer or an expansion unit connected to the computer, the CPU or the like included in the expansion board or the expansion unit may execute part or whole of the actual processing according to the instructions of the program code and the processing may realize the function of the above-described embodiments.

The present invention is not limited to the above embodiments, and various changes and modifications can be made thereto within the sprit and scope of the present invention. Therefore, to apprise the public of the scope of the present invention, the following claims are made.

This application claims priority from Japanese Patent Application No. 2004-091827 filed Mar. 26, 2004, which is hereby incorporated by reference herein.

What is claimed is:

1. An image capturing apparatus comprising:
a preliminary-emission control unit configured to perform preliminary light emission to a subject;
a photometric unit configured to measure brightness of the subject in a picture frame having a plurality of areas at a first timing when the preliminary-emission control unit is not performing preliminary light emission and at a second timing when the preliminary-emission control unit is performing preliminary light emission;
a calculating unit calculating a ratio between first photometric information indicating the brightness measured by the photometric unit at the first timing and second photometric information indicating the brightness measured by the photometric unit at the second timing, the calculating unit calculating the ratio for each of the plurality of areas;
an extracting unit extracting a reference ratio from among the ratios of the plurality of areas calculated by the calculating unit;
an evaluation-value calculating unit comparing the reference ratio extracted by the extracting unit with the ratios of the plurality of areas calculated by the calculating unit, and calculating an evaluation value for each of the plurality of areas based on the comparison; and
an actual-emission-light calculating unit evaluating the second photometric information for each area based on the evaluation value of each area calculated by the evaluation-value calculating unit, and calculating an amount of light to be emitted in an exposure operation based on the evaluation.

2. An image capturing apparatus according to claim 1, wherein the extracting unit compares the ratio for each area calculated by the calculating unit and extracts the largest of the ratios as a reference ratio.

3. An image capturing apparatus according to claim 1, wherein the extracting unit classifies the ratio for each area calculated by the calculating unit into a plurality of groups and extracts a reference ratio according to the group corresponding to the largest number of areas.

4. An image capturing apparatus according to claim 1, wherein the evaluation-value calculating unit compares the reference ratio extracted by the extracting unit with the ratio of each area calculated by the calculating unit and calculates a weighting coefficient for each area based on the comparison, and wherein the actual-emission-light calculating unit calculates a weighting average of the second photometric information for each area based on the weighting coefficient for each area calculated by the evaluation-value calculating unit and calculates the amount of light to be emitted at the exposure operation based on the weighting average.

5. An image capturing apparatus according to claim 1, wherein the actual-emission-light calculating unit calculates third photometric information for each area corresponding to a difference between the first and second photometric information for each area, and calculates the amount of light to be emitted at the exposure operation based on the third photometric information.

6. An image capturing apparatus according to claim 1, wherein the extracting unit extracts the reference ratio from among the ratios in the areas in which the second photometric information is in a predetermined range.

7. An image capturing apparatus according to claim 6, wherein the predetermined range is determined based on a focal length of an objective taking lens.

8. An image capturing apparatus according to claim 6, wherein the predetermined range is determined based on information about a distance to a subject.

9. An image capturing apparatus according to claim 1, wherein the extracting unit obtains third photometric information for each area corresponding to a difference between the first and second photometric information for each area, and extracts the reference ratio from among the ratios in the areas in which the third photometric information is in a predetermined range.

10. An image capturing apparatus according to claim 9, wherein the predetermined range is determined based on a focal length of an objective taking lens.

11. An image capturing apparatus according to claim 9, wherein the predetermined range is determined based on information about a distance to a subject.

12. A method for controlling an amount of light emitted from a strobe device for taking a picture of a subject with an image capturing apparatus, the method comprising the following steps:
a preliminary-emission control step of performing preliminary light emission to the subject;
a measuring step of measuring brightness of the subject in a picture frame having a plurality of areas at a first timing when preliminary light emission is not performed in the preliminary-emission control step and at a second timing when preliminary light emission is being performed in the preliminary-emission control step;
a calculating step of calculating a ratio between first photometric information indicating the brightness measured at the first timing in the measuring step and second photometric information indicating the brightness measured at the second timing in the measuring step, the ratio being calculated for each of the plurality of areas;
an extracting step of extracting a reference ratio from among the ratios for the plurality of areas calculated in the calculating step;

an evaluation-value calculating step of comparing the reference ratio extracted in the extracting step with the ratio for each area calculated in the calculating step and calculating an evaluation value for each area based on the comparison; and an actual-emission-light calculating step of evaluating the second photometric information for each area by using the evaluation value for each area calculated in the evaluation-value calculating step and calculating an amount of light to be emitted in an exposure operation based on the evaluation.

13. A method according to claim 12, wherein the extracting step includes comparing the ratios for each area calculated in the calculating step with each other and extracting the largest ratio as the reference ratio.

14. A method according to claim 12, wherein the extracting step includes classifying the ratios for the areas calculated in the calculating step into a plurality of groups and extracting the reference ratio according to the group corresponding to the largest number of areas.

15. A method according to claim 12, wherein the evaluation-value calculating step includes:

a comparing step of comparing the reference ratio extracted in the extracting step with the ratio for each area calculated in the calculating step; and a weighting coefficient calculating step of calculating a weighting coefficient for each area based on the comparison in the comparing step, and wherein the actual-emission-light calculating step includes:

a weighting average calculating step of calculating a weighting average of the second photometric information for each area by using the weighting coefficient for each area calculated in the evaluation-value calculating step; and calculating the amount of light to be emitted at the exposure operation based on the weighting average.

16. A method according to claim 12, wherein the actual-emission-light calculating step includes calculating third photometric information for each area corresponding to a difference between the first and second photometric information for each area, and calculating the amount of light to be emitted at the exposure operation by using the third photometric information.

17. A method according to claim 12, wherein the extracting step includes extracting the reference ratio from among the ratios in the areas in which the second photometric information is in a predetermined range.

18. A method according to claim 12, wherein the extracting step includes obtaining third photometric information for each area corresponding to a difference between the first and second photometric information for each area, and extracting the reference ratio from among the ratios in the areas in which the third photometric information is in a predetermined range.

19. A program stored on a recording medium for allowing a computer to execute the method according to claim 12.

* * * * *